June 25, 1968  R. E. DE SISTO  3,390,317

MOTOR CONTROL

Filed Jan. 3, 1966

INVENTOR.
RICHARD E. DE SISTO

BY Jacobi & Davidson

ATTORNEYS.

3,390,317
MOTOR CONTROL
Richard E. De Sisto, Salem, Mass., assignor to Signal Manufacturing Company, Salem, Mass., a corporation of Massachusetts
Filed Jan. 3, 1966, Ser. No. 518,227
8 Claims. (Cl. 318—345)

This invention relates to motor controls and is specifically concerned with a universal motor control arrangement which can be easily and inexpensively manufactured and conveniently utilized in appliances or other types of devices.

In recent years, universal motors have been put to widespread use in highly commercial applications. For example, universal motors are commonly found in so-called "home appliances" of various types, including floor polishers, mixers, blenders, and the like. Further, it has become more or less conventional to incorporate some type of speed control on the appliance or device which serves to regulate the operational speed of the operating element or elements. To this end, there have been several prior suggestions including, by way of example, the use of transmissions, the use of special motor windings and/or connections, and the use of gate control electronic valves of differing types. Still, there remains the need for a speed control circuit and/or universal motor arrangement which permits the convenient and rapid desired speed selection by a user, and which further can be manufactured and utilized at minimum cost. The primary object of the present invention is to satisfy such need.

More particularly, it is a primary object of the present invention to provide a universal motor speed control arrangement (a) wherein a minimum number of operating parts and components are incorporated; (b) wherein the circuitry can be easily assembled by mass production techniques; and, (c) wherein desired speed regulation can be conveniently obtained on a reliable basis either by continuous adjustment throughout a given range, or by selective preset adjustment to relatively different speeds such as high speed, medium speed, and low speed.

A somewhat more specific yet equally important object of the present invention is to provide such a universal motor control arrangement wherein "two terminal" solid state electronic valves are utilized rather than three or more terminal valves, and in which the control is obtained through a resistor-capacitor network of the simplest configuration. To this end, the invention contemplates the utilization of bilateral switching means and trigger switching means. The bilateral switching means is of a type which is rendered conductive when the potential existent across the terminals thereof exceeds a given value for either polarity and which remains conductive thereafter until such potential decreases to a value closer to zero. The potential at which the bilateral switching means is rendered conductive in either direction should exceed the potential applied by an associated power supply so that the power supply does not cause a "breakdown," "break-over," or conduction thereof. The trigger switching means preferably comprises a switching diode of a type which is also rendered conductive when the potential applied thereacross in either polarity exceeds a given value. The switching diode "break-over" or activating potential, however, is well within the range of the potential supplied by the associated power supply.

Consistent with the invention, the potential of the power supply, as controlled through a control network, is selectively regulated across the trigger switching means so as to activate the same at desired instances during the AC cycle of the power supply. Activation of the trigger switching means is in turn, through condenser discharge, utilized to establish a "breakdown" or "break-over" potential across the bilateral switching means whereby the same is rendered conductive for selected portions of a half-cycle. The bilateral switching means is serially connected with the universal motor whereby the operational characteristics thereof, as controlled by the trigger switching means, regulate the current through the motor and in turn, the speed thereof.

The invention will be better understood and objects other than those specifically set forth above will become apparent, when consideration is given to the following detailed description. Such description makes reference to the annexed drawings in which.

Figure 1:
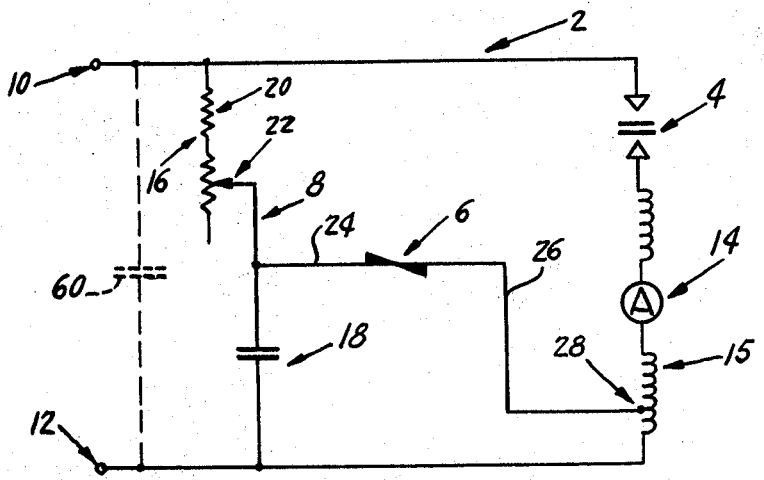
FIGURE 1 is a schematic circuit diagram of a motor arrangement constructed in accordance with the invention.

If reference is first made to FIGURE 1, it will be noted that the adjustable speed motor arrangement shown therein is generally designated by the numeral 2. This arrangement includes a bilateral switching means 4, a trigger switching means 6, and a control network 8. Further, a pair of input terminals 10 and 12 are shown in FIGURE 1 for convenience. A conventional power supply, such as a 110 volt AC line supply, is connected across the terminals 10 and 12 in normal use.

The bilateral switching means 4 is (1) operable when a potential of one polarity existent thereacross exceeds a given value to conduct in one direction; (2) operable when a potential of opposite polarity existent thereacross exceeds an opposite given value to conduct in the opposite direction; and, (3) operable once conduction has started therethrough in either direction to maintain the same until the potential thereacross decreases to a value closer to zero. While any bilateral switching device which is so operative and which functions as prescribed below, can be utilized in accordance herewith, it has been found that silicon bi-switches such as numbers TBS 20A, TBS 20B, TBS 20AS, and TBS 20BS, produced by Transitron Electronic Corporation of Wakefield, Mass., are satisfactory.

The bilateral switching means 4, regardless of particular type of manufacturer, is connected in series with a universal motor 14 having armature and field windings, as shown. This series network of the bilateral switching means 4 and universal motor 14 is connected directly across the terminals 10 and 12 and, therefore, the applied source.

The trigger switching means 6, as also indicated above, is operable to conduct in response to positive potential across its terminals exceeding a given value and in response to negative potential across its terminals exceeding a given value. While here again, any trigger switching means so operating can be used in accordance herewith, it has been found that silicon trigger diode type ER 900, as produced by Transitron Electronic Corporation, of Wakefield, Mass., is also satisfactory.

It is important to note that the positive and negative potentials to which the trigger switching means 6 is responsive to conduct should be of less magnitude than the potential between the terminals of the bilateral switching means 4 necessary to initially render the bilateral switching means conductive. For example, the bilateral switching means 4 preferably has a break-over voltage of the order of +200 volts or more, assuming the applied power supply is 110–120 volts r.m.s. On the contrary, the trigger switching means or trigger diode 6, preferably a symmetrical multi-layer avalanche switching diode, in any event, has a break-over voltage within the range of 25 to 40 volts. With this arrangement, the alternating pulsations or half-cycles of the applied power source cannot, under any circumstances, cause a breakdown or break-over of the bilateral switching means, and to the contrary, such alternate pulsations are only effective through the control network 8 for control of the trigger switching means 6.

The control network 8 includes a resistor means 16 and a capacitor means 18. The resistor means, as shown in FIGURE 1, includes a fixed resistor 20 and a variable resistor or potentiometer 22. The resistor means 16 and capacitor means 18 are connected in series across the power supply terminals 10 and 12, and the potentiometer 22 is connected with one side of the trigger switching means 6 as by conductor 24. The opposite side of the trigger switching means 6 is connected, as by conductor 26, to a tap 28 on field winding 15 of universal motor 14. The tap 28 is so arranged that when the trigger switching means 6 is rendered conductive in either direction, the resultant control signal output, i.e., control pulse, resulting from condenser discharge, as explained below, produced at the top 28 is amplified or stepped-up by the transformer action of the universal motor so that the magnitude thereof as seen by the bilateral switching means 4 exceeds the break-over voltage of the bilateral switching means.

To better understand the foregoing, consider the circuit initially when it is coupled with the power supply across the terminals 10 and 12. At this instance, during the first half-cycle (assuming that it is positive) of the alternating applied voltage, the capacitor means 18 is charged initially through the resistor means 16. When the charge on the capacitor means 18 reaches the break-over or breakdown potential of the trigger switching means 6, then the trigger switching means 6 is rendered conductive or "fires." This results in transmitting the conducting condition of the trigger switching means, as manifest by a discharge pulse from capacitor means 18 to the tap 28. This pulse, for example, of the order of 30 volts, is through the transformer action of the motor winding, stepped-up to a value exceeding, for example, 200 volts. The potential across the bilateral switching means 4 therefore exceeds its break-over voltage and the bilateral switching means is rendered conductive whereby current flows through the motor network per se. The bilateral switching means 4 remains conductive over substantially the entire remainder of the positive half-cycle of the applied potential from the power supply, but as the applied potential decreases toward zero, the potential across the bilateral switching means 4 drops until the bilateral switching means is rendered non-conducting. The portion of the positive half-cycle during which the bilateral switching means was conductive depends upon the setting of the potentiometer 22 because it is this setting which determines the rate at which the condenser means 18 is charged, and in turn the time when the trigger switching means 6 will fire so that the control pulse is supplied to the motor field coil to initiate conduction of the bilateral switching means 4.

During the negative half-cycle essentially the same operation as described above is repeated, but in this instance, the polarities are reversed. Initially, the applied voltage from the power supply existent at the terminals 10 and 12 is insufficient to cause breakdown of the bilateral switching means 4. Accordingly, the condenser means 18 is charged through the resistor means 16 until the negative potential, in this instance, reaches the break-over value for the trigger switching means 6. Once the break-over voltage is reached on the negative half-cycle, the trigger switching means 6 is rendered conductive, thereby supplying a pulse to the tap 28, which pulse is in turn amplified by the transformer action of the universal motor 14, and then existent across the bilateral switching means 4 to render the same conductive. Here again, the time period during which the bilateral switching means conducts on the negative half-cycle is determined by the setting of the potentiometer 22.

Figures 2, 3:
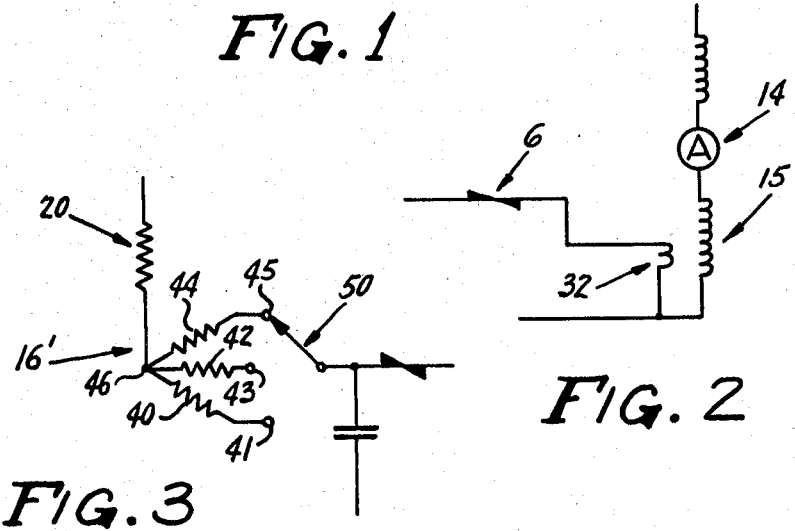
FIGURE 2 is a fragmental detailed circuit diagram showing the modified control connection which can be used in the circuit of FIGURE 1; and, FIGURE 3 is a fragmental circuit diagram showing a modified control resistance arrangement which can be used in the circuit of FIGURE 1.

While the use of a tap on the field coil 15 of the universal motor 14 has been found to provide the most convenient means of feeding the control signal through the trigger switching means to the bilateral switching means, it will be noted that other systems can be used. For example, as shown in FIGURE 2, the trigger switching means 6 can be connected with the field coil 15 of the universal motor means 14 by an auxiliary primary coil 32. This coil is in juxtaposition to the field coil 16, and in actual construction, can be wired thereover or therewith. In this regard, as with the circuit shown in FIGURE 1, when the trigger switching means 6 is rendered conductive, it transmits the condenser discharge through the primary winding 32, which provides the desired transformer action with the field coil 15, in turn developing across the bilateral switching means 4 a potential of sufficient value to cause breakdown thereof.

Another modification to the circuit of FIGURE 1 concerns the resistor means 16. As shown in FIGURE 3, a resistor means 16' includes a fixed resistor 20 and a plurality of selector resistances 40, 42 and 44. The selector resistances 40–44 have one end connected in common as at the terminal 46, but their opposite ends are connected with contacts 41, 43 and 45 of a multi-position switch generally designated by the numeral 50. The arrangement of FIGURE 3 finds particular utility when one wants finite preset control as for high, medium and slow speeds. In this instance, control over speed is achieved by selectively positioning the wiper arm of the multi-position switch 50 in conductive relation with the contacts 41, 43 or 45, thereby determining the charge rate of the condenser means 18 and in turn the instant during the cycle at which the trigger switching means 6 is rendered conductive to supply the control pulse for activating the bilateral switching means 4.

From the foregoing explanation, it will be understood that the high voltage pulse necessary to activate the bilateral switching means 4 is obtained by discharging the capacitor means 18 which itself takes the form of a small condenser, into either a tap on the field coil of the motor or a primary coil preferably wound integral with the field coil. The use of the tap or the primary coil in the motor field eliminates the need for a pulse transformer thus minimizing the number of circuit components required.

The circuit has the additional feature in that by the proper selection of coil impedances, feed-back through the control circuit can be obtained so as to give greater speed control and stability. Further, for stability, a by-pass capacitor, such as the by-pass capacitor 60 shown in phantom in FIGURE 1, can be coupled across the power line, or specifically the terminals 10 and 12 to provide a low impedance path for the trigger pulse.

The circuit essentially operates in normal use by controlling the bilateral switching means 4 so that it fires during a prescribed and preset portion of each half-cycle of the AC supply. Quite obviously, in addition to the motor, the circuit incorporates but five components, namely, the bilateral switching means 4, the trigger switching means 6, the capacitor means 18, a fixed resistor 20, and an adjustable resistor means which preferably takes the form either of the potentiometer 22 or the multi-position resistor switching arrangement shown in FIGURE 3.

The circuit operates reliably over extended periods of time, occupies but a minimum of space in any appliance, and can be manufactured quite inexpensively. It should thus be apparent that the objects set forth at the outset of the specification have been successfully achieved.

Accordingly, what is claimed is:

1. A speed control circuit for a motor having coil means, said circuit comprising the combination of:

(a) bilateral switching means having two terminals, and
  (1) operable when a potential of one polarity existent between said terminals exceeds a given value to conduct in one direction,
  (2) operable when a potential of opposite polarity existent between said terminals exceeds a given value to conduct in the opposite direction, and
  (3) operable once conduction has started therethrough in either direction to maintain the same until the potential thereacross decreases to a value closer to zero;
(b) means for connecting said bilateral switching means in series with said coil means of said motor and across a power supply;
(c) trigger switching means having first and second terminals and operable to conduct in response to positive potential across the terminals thereof exceeding a given value and in response to negative potential across the terminals thereof exceeding a given value;
(d) a control network coupled in parallel across said motor and bilateral switching means, said control network including resistor means and capacitor means connected in series and means connecting said second terminal of said trigger switching means with said network;
(e) means coupling said first terminal of said trigger switching means with said control network and said second terminal of said trigger switching means with said coil means of said motor for producing in said coil means of said motor in response to said conduction of said trigger switching means amplified pulses of sufficient magnitude to render said bilateral switching means conductive in respective opposite directions; and
(f) said positive and negative potentials to which said trigger switching means is responsive to conduct being of less magnitude than the potentials between the terminals of said bilateral switching means necessary to initially render said bilateral switching means conductive.

2. The combination defined in claim 1 wherein said trigger switching means is a symmetrical multi-layer avalanche switching diode, and said bilateral switching means is a unitary solid state switching device.

3. The combination defined in claim 1 wherein said resistor means in said control network includes means for adjusting the operative resistance thereof.

4. The combination defined in claim 3 wherein said resistor means and said capacitor means are connected in series and said first terminal of said trigger switching means is connected to said control network at the junction between said resistor means and said capacitor means.

5. An adjustable speed motor arrangement adapted to be connected across an AC power supply and comprising the combination of:
(a) a universal motor having series connected armature and field coil means;
(b) bilateral switching means having two terminals connected in series with said universal motor across said power supply, and
  (1) operable when a potential of one polarity existent between said terminals exceeds a given value above the maximum value potential of the power supply to conduct in one direction,
  (2) operable when a potential of opposite polarity existent between said terminals exceeds a given value below the minimum value potential of the power supply to conduct in the opposite direction, and
  (3) operable once conduction has started therethrough in either direction to maintain the same until the potential thereacross decreases to a value closer to zero;
(c) a control network coupled in parallel across said motor and bilateral switching means, said control network including resistor means and capacitor means connected in series;
(d) trigger switching means having first and second terminals and operable to conduct in response to positive potential across the terminals thereof exceeding a given value below the maximum value potential of the power supply and in response to negative potential across the terminals thereof exceeding a given value above the minimum value potential of the power supply; and,
(e) means coupling said first terminal of said trigger switching means with said control network for discharge of said capacitor means, and said second terminal of said trigger switching means with said coil means of said motor for producing in said coil means of said motor in response to discharge of said capacitor means with conduction of said trigger switching means amplified pulses of sufficient magnitudes to render said bilateral switching means conductive in respective opposite directions;
(f) said positive and negative potentials to which said trigger switching means is responsive to conduct being of less magnitude than the potentials between the terminals of said bilateral switching means necessary to initially render said bilateral switching means conductive.

6. The combination defined in claim 5 wherein said means coupling said first terminal of said trigger switching means with said coil means of said motor comprises a tap on the field coil of said motor.

7. The combination defined in claim 5 wherein said means coupling said first terminal of said trigger switching means with said coil means of said motor comprises a primary coil disposed in juxtaposition to the field coil of said motor.

8. The combination defined in claim 5 wherein said trigger switching means is a symmetrical multi-layer avalanche switching diode, and said bilateral switching means is a unitary solid state switching device, wherein said resistor means in said control network includes means for adjusting the operative resistance thereof, and wherein said resistor means and said capacitor means are connected in series and said first terminal of said trigger switching means is connected to said control network at the junction between said resistor means and said capacitor means.

References Cited

UNITED STATES PATENTS 3,336,517   8/1967   Cain _____ 318—345 X

ORIS L. RADER, *Primary Examiner.*

J. J. BAKER, *Assistant Examiner.*